UNITED STATES PATENT OFFICE.

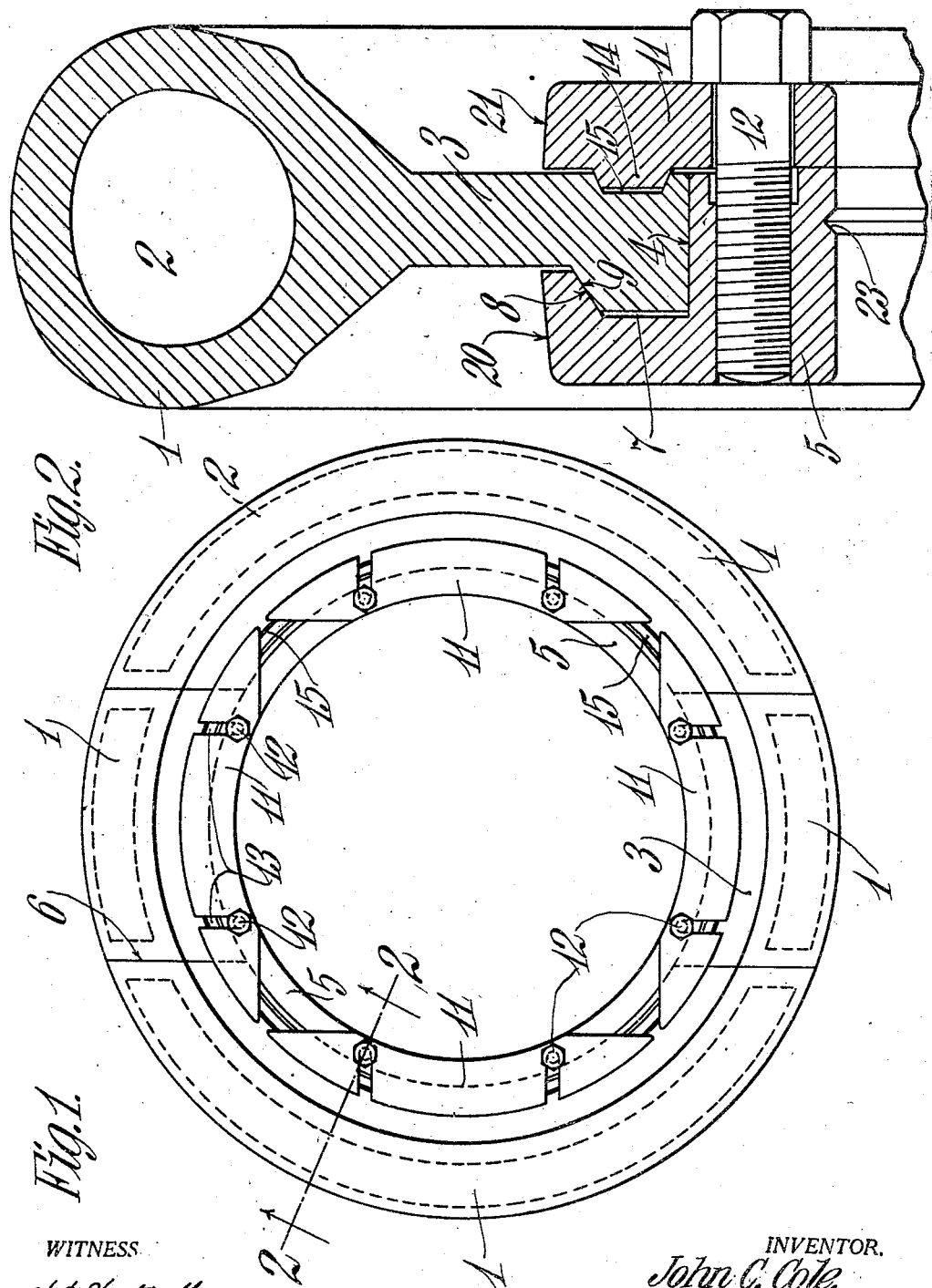

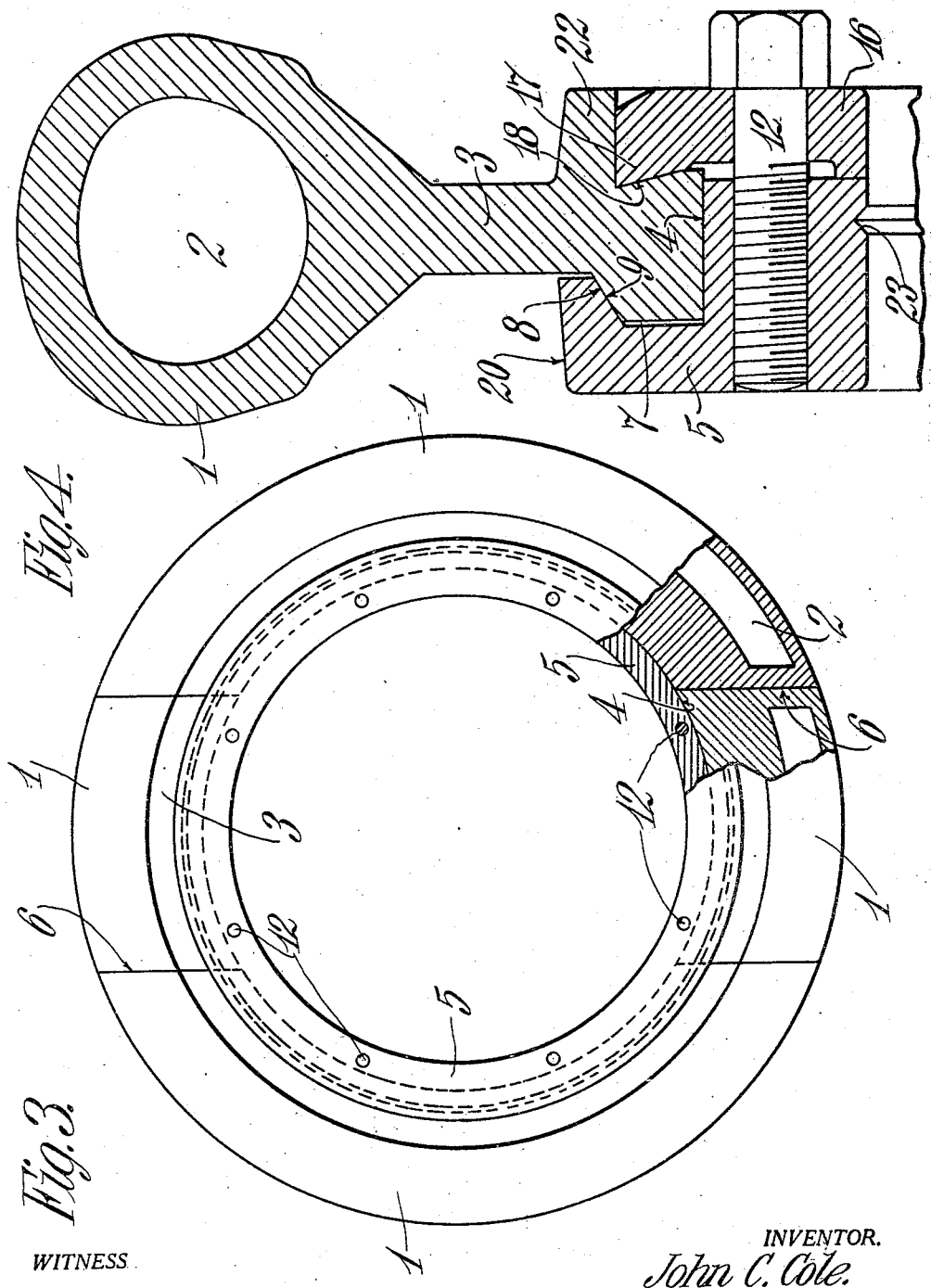

JOHN C. COLE, OF CHICOPEE FALLS, MASSACHUSETTS, ASSIGNOR TO FISK RUBBER COMPANY, OF CHICOPEE FALLS, MASSACHUSETTS, A CORPORATION OF MASSACHUSETTS.

COLLAPSIBLE CORE.

1,189,192.

Specification of Letters Patent. Patented June 27, 1916.

Application filed December 10, 1915. Serial No. 66,093.

*To all whom it may concern:*

Be it known that I, JOHN C. COLE, a citizen of the United States of America, and residing in Chicopee Falls, in the county of Hampden and State of Massachusetts, have invented certain new and useful Improvements in Collapsible Cores, of which the following is a specification.

This invention relates to improvements in collapsible cores and particularly to cores of this type for use in the manufacture of the outer casings or shoes of pneumatic tires.

An object of the invention is to provide in a collapsible core structure, having a solid annular supporting ring and a plurality of core sections adapted to rest thereon, a plurality of segmental clamping plates adapted to be secured to said ring and to coöperate therewith to hold the several core sections in abutting relation, said plates being constructed for independent removal in a radially inward direction without removal of the securing means.

Other objects and advantages will appear in the detailed description and annexed claims.

Referring to the accompanying drawings as illustrative of one way in which the invention may be put to use Figure 1 is a front elevational view of the assembled collapsible core structure; Fig. 2 is an enlarged cross sectional view taken on the line 2—2 of Fig. 1 and looking in the direction of the arrows; Fig. 3 is a rear elevational view of the core structure; and Fig. 4 is a view, generally similar to Fig. 2, showing a modification of the invention.

Referring to these drawings in detail, 1 represents segmental core sections, of the cross-sectional shape shown in Fig. 2, which have the usual cored passages 2. Upon the outer portion of the assembled core sections the tire shoe is built up in the usual way. Extending radially inward from the outer portions of the core sections are webs 3, the bases of which are formed with finished arc-shaped surfaces 4. A solid ring 5 is formed with a part which underlies the core sections 1 and has a finished peripheral surface to receive the surfaces 4. When all of the latter rest on the peripheral surface of ring 5, the several sections 1 exactly abut with one another as shown at 6, so that a smooth unbroken annular ring surface is provided for the formation of the tire body. The ring 5 is also formed with an upstanding side flange which has a circular groove 7 cut in the inner side thereof. The upper surface 8 of this groove is inclined to the axis of the ring 5 and is adapted to engage a similarly inclined surface 9 on web 3. It will be obvious that as the core sections 1 are forced laterally along the ring 5 the coaction of the inclined surfaces 8 and 9 will force the core sections 1 downwardly so that the surfaces 4 engage the peripheral surface of ring 5. To so force the core sections along the ring and to thereafter hold the several sections to the ring in abutting relation, a plurality of segmental plates 11 are employed, as best shown in Fig. 1. Bolts 12, threaded into ring 5, pass loosely through slots 13 in plates 11 and hold the latter to the ring. The inner faces of the plates 11 have arc-shaped projections 14 with tapered sides, which are adapted to engage in arc-shaped grooves 15 in the webs 3. The grooves 15 also have tapered sides, and the coaction of projections 14 therewith assists in drawing the core sections down upon ring 5. The slots 13 in each plate 11 are parallel and the length of the plate, as shown in Fig. 1, is such that any one thereof may be withdrawn radially inward. It is not necessary to remove the bolts 12 but simply to loosen them sufficiently to permit the withdrawal of the projections 14 from grooves 15.

The modified structure shown in Fig. 4 is generally similar to that already described. In place of plates 11, however, other segmental plates 16 are used which have inwardly inclined upper portions 17. The latter engage an inclined surface 18 on the side face of the web 3 for a purpose analogous to that already described. The plates 16 are otherwise similar to the plates 11.

In practice, the core with the tire shoe thereon is placed in a suitable mold, and it is necessary to provide means on the core structure to engage and accurately position the mold. With the construction shown in Fig. 2, the surfaces 20 and 21 in the ring 5 and plates 11 respectively are adapted to perform this function. Where it is desirable to position the mold from the core itself, rather than from parts associated with the core, the construction shown in Fig. 4 is used. Here an integrally formed outstanding flange 22 is formed on each core section, the upper surface of which is arranged as a positioning means for the mold.

In operation, the several sections 1 are laid up on ring 5 and the plates 11 then applied. By setting up the bolts 12, the core sections are drawn down upon the peripheral surface of ring 5, which underlies the sections, and are caused to abut one with another to form a smooth unbroken annular ring surface for the formation of the tire shoe. It is absolutely essential that the several core sections accurately abut one another so that the assembled sections present a smooth and unbroken surface as a solid ring would present. Consequently, having the core sections accurately positioned, it is desirable not to disturb them even slightly from their positions. To prevent any such displacement, the ring 5 is arranged to completely underlie the sections and to receive the thrust of the extensible arms commonly used in connection with such cores to support them for rotation in a machine. With the improved structure described, the extensible arms or equivalent devices act against the interior surface of ring 5 and are positioned by the V-shaped groove 23 (see Fig. 2). The thrust is thus taken up by a solid ring which cannot yield, as against applying the thrust to the base of the core or parts associated with the core which are segmental.

When the tire shoe has been removed from the mold after vulcanization, it is then necessary to remove the core sections. The bolts 12 are not withdrawn, as heretofore common, but are simply loosened a slight amount. Each plate 11 may then be drawn radially inward after which the ring 5 may be removed as a unit. Each core section 1 may then be removed from the interior of the shoe in the usual manner.

Thus, an improved collapsible core structure has been provided which is characterized in that it may be accurately assembled in a rapid and efficient manner. It is recognized that modifications may be made in the particular embodiment described for illustrative purposes without departing from the scope of the invention which is defined by the appended claims rather than by the foregoing description of a preferred specific form.

What I claim is—

1. A collapsible core, comprising, a plurality of segmental core sections adapted to abut with one another to form an annular core ring, a supporting ring for said sections having a peripheral surface and an upstanding flange adapted to hold said sections against radial and lateral movement respectively, a plurality of plates each arranged to separately clamp a section against said flange, slots formed in said plates and securing devices extending through the slots and into said supporting ring, said plates being so constructed and arranged relatively to one another that each thereof may be withdrawn independently of the other without removing said devices from said ring.

2. A collapsible core, comprising, in combination, a plurality of segment shaped core sections adapted to abut with one another to form an annular core ring, a supporting ring for said sections having a peripheral surface and an upstanding flange adapted to hold said sections against radial and lateral movement respectively, and means to clamp said sections against said flange, comprising, a plurality of segment shaped plates each formed with parallel slots and securing devices extending through said slots into said supporting ring, said plates constructed and arranged for independent withdrawal radially without removing said devices from the supporting ring.

3. A collapsible core, comprising, in combination, a plurality of segment shaped core sections adapted to abut with one another to form an annular core ring, a solid ring having a peripheral surface adapted to support said sections and an upstanding flange to engage one face of said sections, a groove formed in said flange, beads formed on said sections, said groove and beads formed with mutually engageable inclined surfaces adapted when the sections are moved laterally along said ring to force the sections downwardly upon said surface and into precise abutting relation, and means to laterally move said sections comprising a series of segment shaped plates each formed with parallel slots, securing devices on said ring and extending through said slots, whereby said plates may be withdrawn radially with respect to said ring without removing the securing devices thereon.

4. A collapsible core, comprising, in combination, a plurality of segment shaped core sections adapted to abut with one another to form an annular core ring, a solid ring having a part arranged to completely underlie said sections and an upstanding flange to engage one side face of said sections, mutually engageable cam surfaces formed on said flange and sections arranged on lateral movement of the sections to draw the latter downwardly upon said part and into accurate abutting relation with each other, and means to move the sections laterally, comprising, a series of segmental plates each formed with parallel slots therein, inclined surfaces formed on the inner faces of said plates adapted to engage other inclined surfaces on said sections, and bolts threaded into said ring and passing loosely through said slots, whereby the plates may be moved laterally with respect to the ring to draw the sections downwardly upon said part, all constructed and arranged for independent removal of said plates in a radial direction without removal of said bolts.

JOHN C. COLE.